(12) United States Patent
Morioka

(10) Patent No.: US 12,267,916 B2
(45) Date of Patent: Apr. 1, 2025

(54) COMMUNICATION APPARATUS AND COMMUNICATION METHOD

(71) Applicant: SONY GROUP CORPORATION, Tokyo (JP)

(72) Inventor: Yuichi Morioka, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/646,235

(22) Filed: Dec. 28, 2021

(65) Prior Publication Data

US 2022/0124872 A1 Apr. 21, 2022

Related U.S. Application Data

(63) Continuation of application No. 16/498,671, filed as application No. PCT/JP2018/008421 on Mar. 5, 2018, now Pat. No. 11,252,785.

(30) Foreign Application Priority Data

May 2, 2017 (JP) .................................. 2017-091724

(51) Int. Cl.
*H04W 84/12* (2009.01)
*H04B 7/26* (2006.01)
(Continued)

(52) U.S. Cl.
CPC .......... *H04W 84/12* (2013.01); *H04B 7/2606* (2013.01); *H04W 72/0446* (2013.01); *H04W 72/23* (2023.01); *H04W 74/0808* (2013.01)

(58) Field of Classification Search
CPC . H04W 84/12; H04W 72/04; H04W 72/0446; H04W 72/0453; H04W 72/0457;
(Continued)

(56) References Cited

U.S. PATENT DOCUMENTS 9,998,262 B2 6/2018 Abeysekera et al.
10,129,887 B2 * 11/2018 Pabla ....................... H01Q 1/48
(Continued)

FOREIGN PATENT DOCUMENTS

CN 101978730 A 2/2011
CN 102497255 A 6/2012
(Continued)

OTHER PUBLICATIONS

Office Action for JP Application No. 2019-516364, dated May 31, 2022, 4 pages of office action.
(Continued)

*Primary Examiner* — Kan Yuen
(74) *Attorney, Agent, or Firm* — CHIP LAW GROUP

(57) ABSTRACT

A communication apparatus and a communication method for performing wireless data transmission using multiple channels are provided. The communication apparatus operating as a base station includes: a communication section that transmits and receives a wireless signal; and a control section that controls a channel used by a subordinate wireless terminal, the control section designates a first transmission scheme to a first wireless terminal that uses a specific primary channel, and designates a second transmission scheme different from the first transmission scheme to a second wireless terminal that uses a non-primary channel that does not include the primary channel. The second transmission scheme has a lower data rate or higher transmission power than that of the first transmission scheme.

8 Claims, 14 Drawing Sheets

(51) Int. Cl.
*H04W 72/0446* (2023.01)
*H04W 72/23* (2023.01)
*H04W 74/0808* (2024.01)

(58) Field of Classification Search
CPC ............. H04W 72/23; H04W 74/0808; H04W 74/0816; H04W 52/243; H04B 7/2606
See application file for complete search history.

(56) References Cited

U.S. PATENT DOCUMENTS

| | | | | |
|---|---|---|---|---|
| 10,348,471 | B2* | 7/2019 | Noh | H04L 5/0094 |
| 2003/0153346 | A1* | 8/2003 | Kim | H04W 52/38 |
| | | | | 455/69 |
| 2004/0014425 | A1* | 1/2004 | Unno | H04W 52/265 |
| | | | | 455/70 |
| 2006/0246917 | A1* | 11/2006 | Jin | H04W 16/02 |
| | | | | 455/450 |
| 2007/0287388 | A1* | 12/2007 | Oestreich | H04W 52/16 |
| | | | | 455/67.13 |
| 2008/0176554 | A1 | 7/2008 | John et al. | |
| 2008/0192644 | A1 | 8/2008 | Utsunomiya | |
| 2012/0134275 | A1* | 5/2012 | Choi | H04L 5/0057 |
| | | | | 370/241 |
| 2013/0107829 | A1* | 5/2013 | Shao | H04W 72/02 |
| | | | | 370/329 |
| 2014/0064101 | A1* | 3/2014 | Hart | H04W 74/0808 |
| | | | | 370/241 |
| 2014/0328195 | A1* | 11/2014 | Sampath | H04W 72/0453 |
| | | | | 370/252 |
| 2014/0328265 | A1 | 11/2014 | Sampath et al. | |
| 2014/0341162 | A1* | 11/2014 | Yang | H04L 1/0015 |
| | | | | 370/329 |
| 2014/0362840 | A1 | 12/2014 | Wong | |
| 2015/0078354 | A1 | 3/2015 | Chen | |
| 2016/0128001 | A1 | 5/2016 | Tsuda | |
| 2016/0165607 | A1* | 6/2016 | Hedayat | H04W 24/00 |
| | | | | 370/338 |
| 2016/0295591 | A1 | 10/2016 | Sampath et al. | |
| 2016/0302156 | A1 | 10/2016 | Hangyu et al. | |
| 2016/0316476 | A1 | 10/2016 | Sampath et al. | |
| 2016/0323853 | A1 | 11/2016 | Jeongki | |
| 2016/0338033 | A1 | 11/2016 | Xiao | |
| 2017/0105176 | A1 | 4/2017 | Finnegan | |
| 2017/0111824 | A1 | 4/2017 | Wang | |
| 2017/0181073 | A1 | 6/2017 | Mohamed | |
| 2017/0237532 | A1* | 8/2017 | Li | H04L 27/2666 |
| | | | | 370/338 |
| 2017/0332286 | A1* | 11/2017 | Lepp | H04W 72/12 |
| 2018/0063823 | A1 | 3/2018 | Sampath et al. | |
| 2018/0227800 | A1 | 8/2018 | Wang | |
| 2020/0107393 | A1* | 4/2020 | Chu | H04L 1/0003 |

FOREIGN PATENT DOCUMENTS

| | | |
|---|---|---|
| CN | 104488347 A | 4/2015 |
| CN | 105165088 A | 12/2015 |
| CN | 105191380 A | 12/2015 |
| CN | 106134246 A | 11/2016 |
| CN | 107786982 A | 3/2018 |
| EP | 2992700 A1 | 3/2016 |
| EP | 2992720 A1 | 3/2016 |
| EP | 3123770 A1 | 2/2017 |
| EP | 3169126 A1 | 5/2017 |
| EP | 3169127 A1 | 5/2017 |
| JP | 2010-517375 A | 5/2010 |
| JP | 2011-082993 A | 4/2011 |
| JP | 2014-507870 A | 3/2014 |
| JP | 2016524837 A | 8/2016 |
| JP | 2017-502567 A | 1/2017 |
| JP | 2017-055398 A | 3/2017 |
| JP | 6246902 B2 | 12/2017 |
| JP | 6250791 B2 | 12/2017 |
| JP | 6328266 B2 | 5/2018 |
| JP | 6573950 B2 | 9/2019 |
| JP | 2019-169965 A | 10/2019 |
| KR | 10-2016-0003147 A | 1/2016 |
| KR | 10-2016-0003149 A | 1/2016 |
| KR | 10-2017-0125416 A | 11/2017 |
| RU | 2529358 C2 | 9/2014 |
| RU | 2016141847 A | 4/2018 |
| WO | 2012097502 A1 | 7/2012 |
| WO | 2014/179579 A1 | 11/2014 |
| WO | 2014/179606 A1 | 11/2014 |
| WO | 2015/145283 A1 | 10/2015 |
| WO | 2016085276 A1 | 6/2016 |

OTHER PUBLICATIONS

Extended European Search Report of EP Application No. 18794496.2, issued on Mar. 11, 2020, 7 pages.
Park, et al., "Efficient Multi-Channel Operation in 11ay", LG Electronics, IEEE, May 16, 2016, 11 pages.
Office Action issued in Russian Federation Appln. No. 2019133799, dated Jun. 30, 2021.
Office Action of Application No. 11201908694Q, issued on Mar. 22, 2021, 6 pages.
International Search Report and Written Opinion for PCT application No. PCT/JP2018/008421 mailed on May 15, 2018, 15 pages with 7 pages of translation.
International Preliminary Report on Patentability for PCT application No. PCT/JP2018/008421 mailed on Nov. 11, 2019, 5 pages with 3 pages of translation.
Sungjin Park (LG Electronics), Efficient multi-channel operation in11ay, IEEE 802.11-16/0687r0, 2016.
Notification of Reasons for Refusal for JP Application No. 2019-516364, dated Feb. 22, 2022.

* cited by examiner

EXAMPLE OF CONFIGURATION OF TRIGGER FRAME

COMMUNICATION APPARATUS AND COMMUNICATION METHOD

CROSS REFERENCE TO RELATED APPLICATIONS

The present application is a continuation application of U.S. patent application Ser. No. 16/498,671 filed Sep. 27, 2019, which is a National Phase of International Application No. PCT/JP2018/008421 filed on Mar. 5, 2018, which claims the benefit of priority from Japanese Patent Application No. 2017-091724, filed in the Japanese Patent Office on May 2, 2017. Each of the above-referenced applications is hereby incorporated herein by reference in its entirety.

TECHNICAL FIELD

The technique disclosed in the present specification relates to a communication apparatus and a communication method for performing wireless data transmission in a multichannel wireless environment.

BACKGROUND ART

As examples of a technique realizing speed enhancing in a wireless LAN (Local Area Network) system typified by wireless LAN system under IEEE802.11, channel bonding and MIMO (Multiple Input Multiple Output) can be cited. Out of these two techniques, the channel bonding is a technique for combining adjacent channels for making communication in use frequency bands (refer to, for example, PTL 1). While a band available to one channel is 20 MHz in IEEE802.11a/g, a transmission speed can be made two or more times as high as that in a case of one channel by making communication at, for example, 40 MHz corresponding to the bands for two channels.

Furthermore, a task group of next-generation LAN standards IEEE802.11ax takes into account improvement of throughput by introduction of new interference avoidance and frequency selection technique (refer to, for example, PTL 2).

CITATION LIST

Patent Literature

[PTL 1]
Japanese Patent Laid-open No. 2011-82993
[PTL 2]
Japanese Patent Laid-open No. 2017-55398

SUMMARY

Technical Problem

An object of the technique disclosed in the present specification is to provide a communication apparatus and a communication method for performing wireless data transmission in a multichannel wireless environment.

Solution to Problem

The technique disclosed in the present specification is made in the light of the above problem, and according to a first aspect of the technique, there is provided a communication apparatus operating as a base station, including: a communication section that transmits and receives a wireless signal; and a control section that controls a channel used by a subordinate wireless terminal, in which the control section designates a first transmission scheme to a first wireless terminal that uses a channel including a specific primary channel, and designates a second transmission scheme different from the first transmission scheme to a second wireless terminal that uses solely a non-primary channel.

The communication apparatus as the base station designates the second transmission scheme different from the first transmission scheme to the second wireless terminal using, for example, a frame for inducing the subordinate wireless terminal to transmit a signal. In addition, the control section designates the second transmission scheme having a lower data rate or higher transmission power than a data rate or transmission power of the first transmission scheme to the second wireless terminal.

Furthermore, the control section may control the channel used by the wireless terminal on the basis of notification of a detected interference amount per channel received from the wireless terminal.

Furthermore, according to a second aspect of the technique disclosed in the present specification, there is provided a communication method by a communication apparatus operating as a base station, including the steps of: designating a first transmission scheme to a first wireless terminal that uses a channel including a specific primary channel; and designating a second transmission scheme different from the first transmission scheme to a second wireless terminal that uses solely a non-primary channel.

Moreover, according to a third aspect of the technique disclosed in the present specification, there is provided a communication apparatus operating to be subordinate to a base station, including: a communication section that transmits and receives a wireless signal; and a control section that controls a communication operation performed by the communication section, in which the control section exercises control in such a manner as to execute signal transmission by a first transmission scheme when a channel including a specific primary channel is used, or to execute signal transmission by a second transmission scheme different from the first transmission scheme when a non-primary channel is solely used.

The communication apparatus receives a frame inducing the communication apparatus to transmit a signal from the base station, and the control section exercises control over a channel and a transmission scheme used in signal transmission on the basis of the received frame. In addition, the control section exercises control in such a manner as to execute signal transmission by the second transmission scheme having a lower data rate or higher transmission power than a data rate or transmission power of the first transmission scheme when the non-primary channel is solely used.

Furthermore, the communication apparatus may further include a detection section that detects an interference amount of each available channel, and the control section exercises control to transmit notification of the detected interference amount per channel to the base station.

Furthermore, according to a fourth aspect of the technique disclosed in the present specification, there is provided a communication method by a communication apparatus operating to be subordinate to a base station, including the steps of: executing signal transmission by a first transmission scheme using a channel including a specific primary channel; and executing signal transmission by a second transmission scheme different from the first transmission scheme using solely a non-primary channel.

Advantageous Effects of Invention

According to the technique disclosed in the present specification, it is possible to provide a communication apparatus and a communication method for performing wireless data transmission in a multichannel wireless environment.

It is noted that advantages described in the present specification are given as an example only, and the advantages of the present invention are not limited to these. Furthermore, the present invention may exhibit additional advantages other than the above advantages.

Still other objects, features, and advantages of the technique disclosed in the present specification will be readily apparent from more detailed description based on an embodiment to be described later and accompanying drawings.

DESCRIPTION OF EMBODIMENT

An embodiment of the technique disclosed in the present specification will be described in detail with reference to the drawings.

Figure 1:
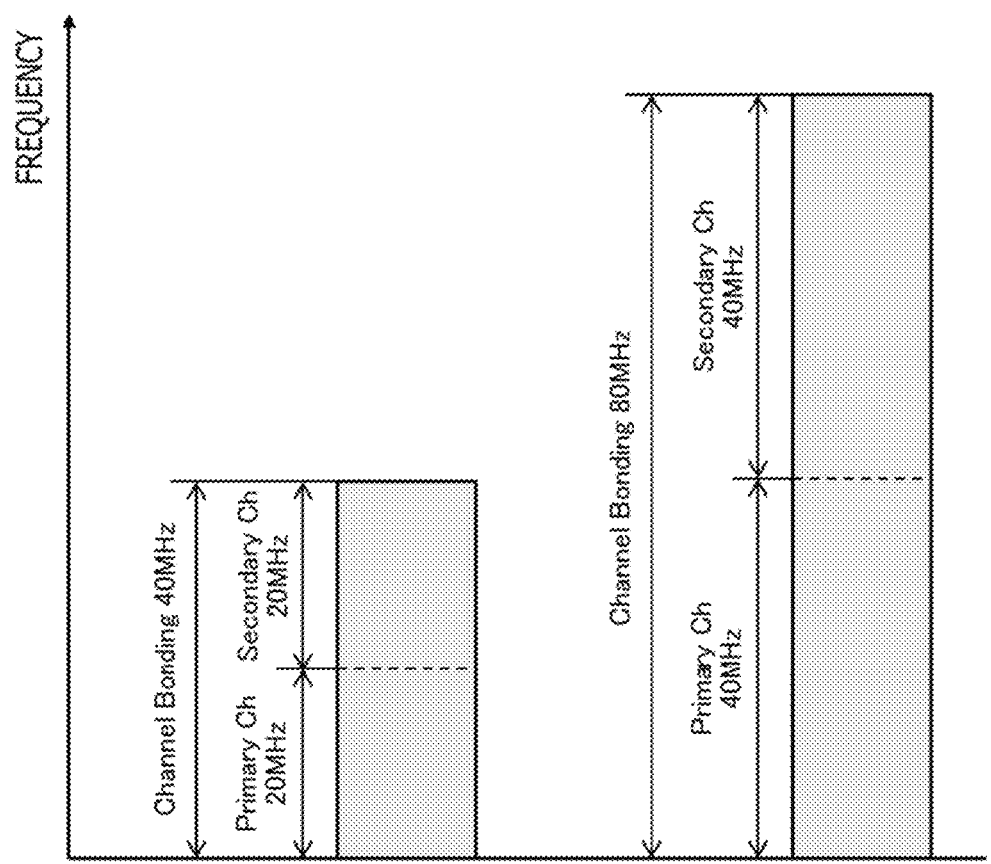
FIG. 1 is a diagram depicting an example of data transmission using channel bonding.

Channel bonding is a technique for combining adjacent channels for communication in use frequency bands (as described above). Basically, a primary channel and a secondary channel (or non-primary channel) having the same bandwidth are provided in use frequency bands. Furthermore, only the primary channel is used in ordinary data transmission, while high-speed or large-capacity data transmission is performed at a transmission speed twice as high as an ordinary transmission speed using a channel obtained by combining the primary channel and the secondary channel by the channel bonding and having a bandwidth twice as large as that of a single channel (refer to FIG. 1).

In a wireless LAN system under IEEE802.11 using either 2.4 GHz or 5 GHz, for example, combining the primary channel and the secondary channel, each of which is assumed to have a bandwidth of 20 MHz, by the channel bonding enables data transmission using a channel having a bandwidth of 40 MHz twice as large as that of the single channel. Moreover, combining the primary channel and the secondary channel, each of which is assumed to have a bandwidth of 40 MHz, by the channel bonding enables data transmission using a channel having a bandwidth of 80 MHz twice as large as that of the single channel.

Furthermore, combining the primary channel and two or more non-primary channels makes it possible to realize a higher transmission speed that is three or more times as high as that of the single channel. In the present specification, a channel other than the primary channel is also referred to as "non-primary channel." It is assumed that the primary channel and each non-primary channel are basically identical in bandwidth. The secondary channel is one type of non-primary channel.

In the above wireless LAN system under IEEE802.11 using either 2.4 GHz or 5 GHz, for example, combining the primary channel and three non-primary channels each of which has a bandwidth of 20 MHz by the channel bonding makes it possible to realize high-speed transmission using a channel having a bandwidth of 80 MHz.

There are many cases in which high-speed data transmission is necessary for a high-definition motion video content and the like. On the other hand, in case of wireless sensor networks referred to as IoT (Internet of Things) or M2M (Machine to Machine), opportunities of small-capacity data transmission are increasing. In the latter case of the small-capacity data transmission, channel bonding is unnecessary and data can be transmitted using a channel having a bandwidth of 20 MHz.

In the wireless LAN system under IEEE802.11 to date (or at the time of filing the present application), data transmission is limited to that using a specific primary channel prescribed by base stations (access points: APs) (regardless of the use of the channel bonding). Owing to this, speed enhancing can be realized using the channel bonding at a time of large-capacity data transmission; however, in a case of transmission of much small-capacity data, it is required to execute small-capacity data transmission using the specific primary channel in a time-division fashion.

In other words, it takes long data transmission time as a whole at the time of transmission of much small-capacity data; thus, speed enhancing cannot be achieved. Furthermore, during time-division transmission of small-capacity data, only the specific primary channel is used in entire frequency bands available to a system and an unused state of non-primary channels continues, resulting in great deterioration of frequency utilization efficiency.

Figure 2:
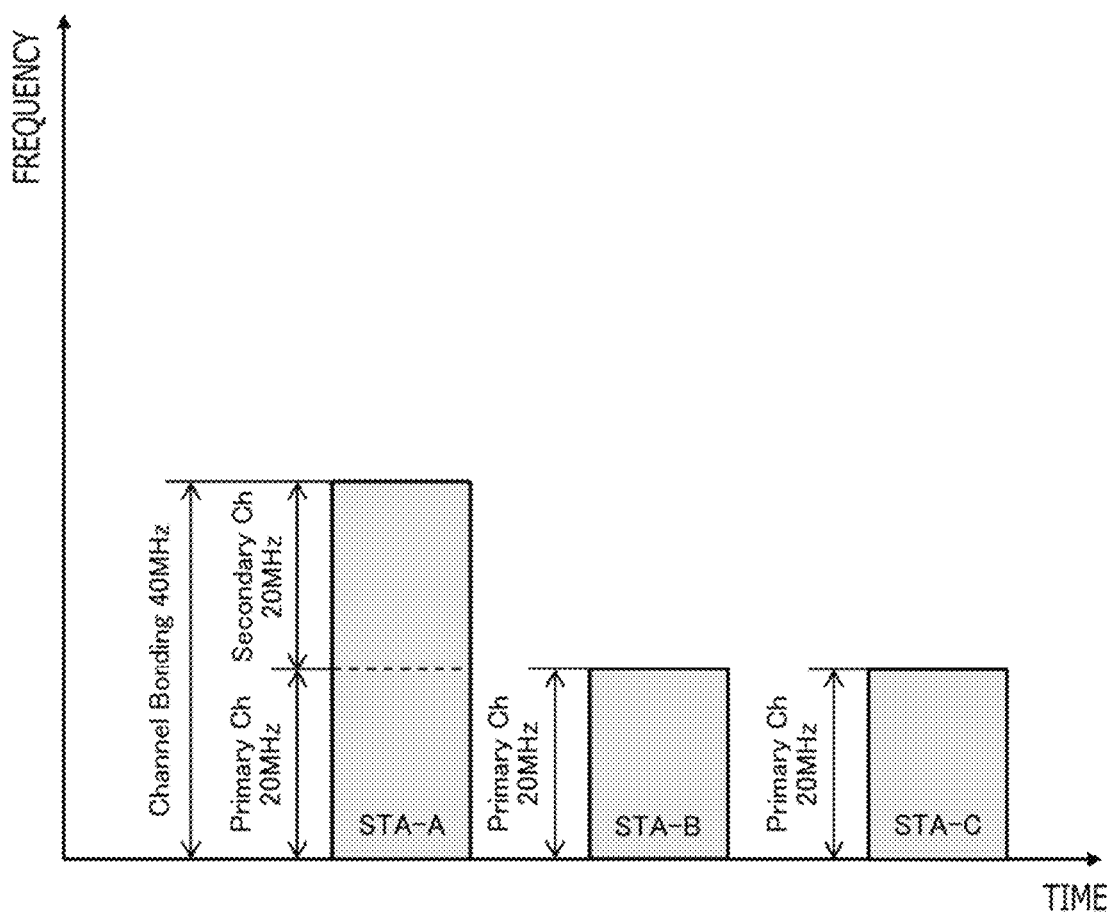
FIG. 2 is a diagram depicting an example of a communication sequence in which it is essential to use a primary channel.

FIG. 2 typically depicts an example of a communication sequence in which it is essential to use a specific primary channel in the current IEEE802.11 system. It is supposed herein that a STA-A having large-capacity transmission data and a STA-B and a STA-C each having small-capacity transmission data are present within a BSS (Basic Service Set).

The STA-A can perform high-speed data transmission using a channel at a bandwidth of 40 MHz by combining the primary channel and the secondary channel that is the non-primary channel using the channel bonding. On the other hand, each of the STA-B and STA-C executes time-division data transmission using the primary channel at 20 MHz. It is essential to use the primary channel and data transmission using solely the non-primary channel is not permitted. Owing to this, in the system as a whole, speed enhancing cannot be achieved for the small-capacity data transmission of the STA-B and the STA-C. Moreover, the frequency utilization efficiency is considerably deteriorated since the STA-B and the STA-C perform data transmission using only the primary channel.

To address the problem, therefore, a wireless data transmission technique capable of achieving speed enhancing and improving the frequency utilization efficiency even at the time of the small-capacity data transmission by permitting data transmission using solely the non-primary channel without making essential the use of the specific primary channel is proposed below in the present specification.

Figure 3:
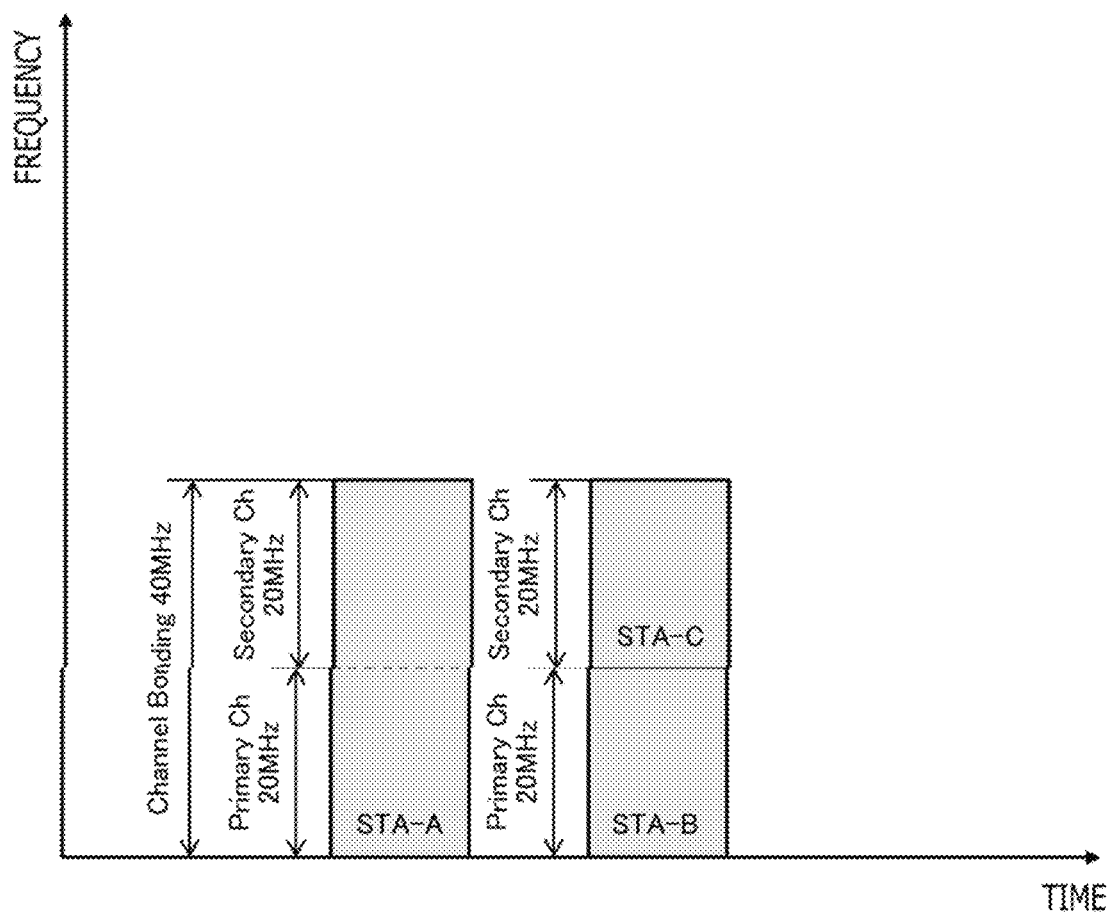
FIG. 3 is a diagram depicting an example of a communication sequence in which it is permitted to transmit a signal using solely a non-primary channel.

FIG. 3 typically depicts an example of a communication sequence in which it is not essential to use the specific primary channel and it is permitted to transmit a signal using solely the non-primary channel. As for the permission of data transmission using solely the non-primary channel, it is assumed, however, that data transmission is basically executed in accordance with the current IEEE802.11 standards unless specified otherwise hereinafter. It is supposed herein, similarly to the example depicted in FIG. 2, that the STA-A having large-capacity transmission data and the STA-B and the STA-C each having small-capacity transmission data are present within a BSS.

The STA-A can perform high-speed data transmission using a channel at a bandwidth of 40 MHz by combining the primary channel and the secondary channel using the channel bonding (ditto).

Furthermore, permitting data transmission using solely the non-primary channel enables the STA-B and the STA-C each having small-capacity transmission data to execute data transmission at the same time using the primary channel and the secondary channel, respectively. Therefore, it is possible to achieve speed enhancing by frequency division of the small-capacity data transmission of the STA-B and the STA-C. In a system as a whole, the frequency utilization efficiency is improved since the STA-B and the STA-C perform data transmission using the primary channel and the non-primary channel, respectively.

Figure 4:
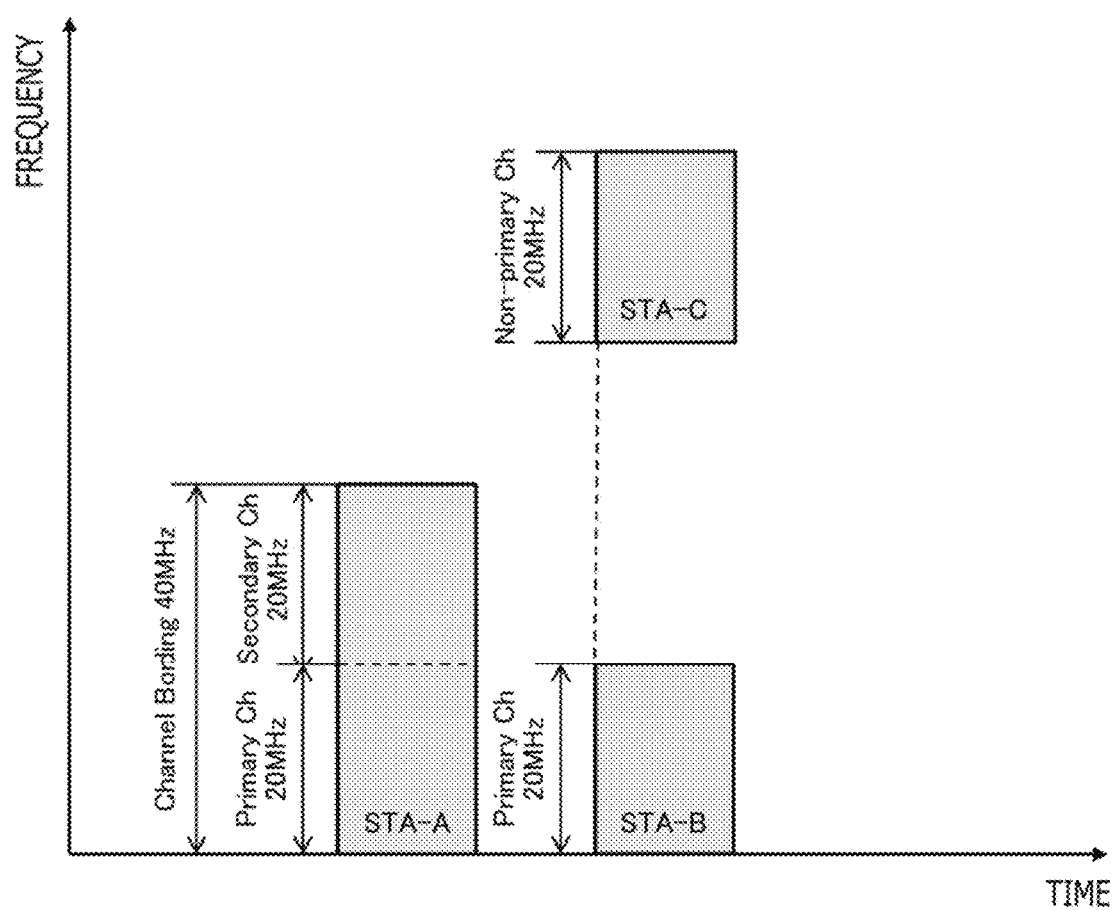
FIG. 4 is a diagram depicting an example of a communication sequence in which it is permitted to transmit a signal using solely a non-primary channel.

It is noted that the non-primary channel permitted to be used for transmission is not limited to the secondary channel consecutive to the primary channel (or adjacent to the primary channel) as depicted in FIG. 3. As depicted in FIG. 4, for example, it is permitted to transmit data using solely the non-primary channel apart from the primary channel on a frequency axis. In other words, the non-primary channel is not limited to that at the same bandwidth as that of the primary channel and it is also supposed to use a non-primary channel at 40 MHz, 60 MHz, 80 MHz, or the like obtained by combining a plurality of non-primary channels by the channel bonding.

Meanwhile, in the wireless LAN system typified by that under IEEE802.11, each wireless terminal adopts a procedure for starting signal transmission upon confirming a usage situation of a channel to be used by the wireless terminal in advance, thereby avoiding collision of the data transmission against data transmission by the other wireless terminal. As described in the present embodiment, in the system using multiple channels including the primary channel and one or more non-primary channels including the secondary channel, signal transmission is started upon confirming a usage situation per channel to be used.

Figure 5:
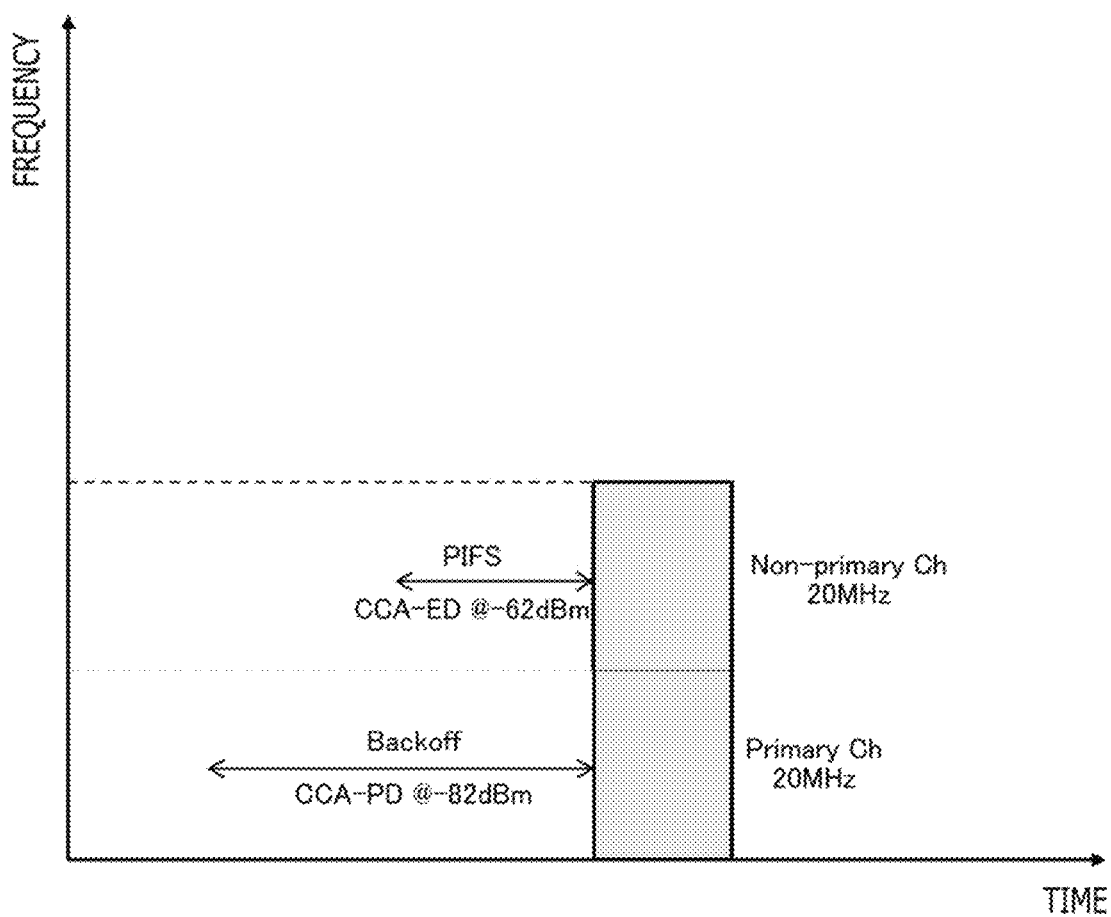
FIG. 5 is a diagram depicting a multichannel signal transmission procedure by a wireless terminal.

FIG. 5 depicts a multichannel signal transmission procedure by the wireless terminal supposed in the present embodiment. In the signal transmission procedure depicted in FIG. 5, different collision avoidance mechanisms are applied to the primary channel and the non-primary channel (secondary channel).

In a case of using the primary channel, the wireless terminal sets random latency (Backoff), and tries to detect a signal received at power equal to or higher than −82 dBm using a mechanism called CCA (Clear Channel Assessment)-PD (Preamble Detection) or CCA-SD (Signal Detection). In addition, in a case in which the wireless terminal is unable to detect a signal for a certain time or longer, the wireless terminal can determine that the primary channel is not used by the other terminal and is available to the wireless terminal (that is, no collision occurs).

Furthermore, the wireless terminal that desires to use the non-primary channel as well as the primary channel by the channel bonding tries to detect a signal received at power equal to or higher than −62 dBm for a certain time (for example, PIFS (PCF (Point Coordination Function) Inter Frame Space)) before planned transmission start time using a mechanism called CCA-ED (Energye Detection). In addition, in a case in which the wireless terminal is unable to detect a signal for a certain time or longer, the wireless terminal can determine that the non-primary channel is not used by the other terminal and is available to the wireless terminal.

In other words, it is to be understood that the primary channel and the non-primary channel are asymmetric (or not identical) in interference amount. The wireless terminal using the primary channel and the non-primary channel by the channel bonding executes signal detection in the non-primary channel at a low sensitivity than that of the primary channel.

Figure 6:
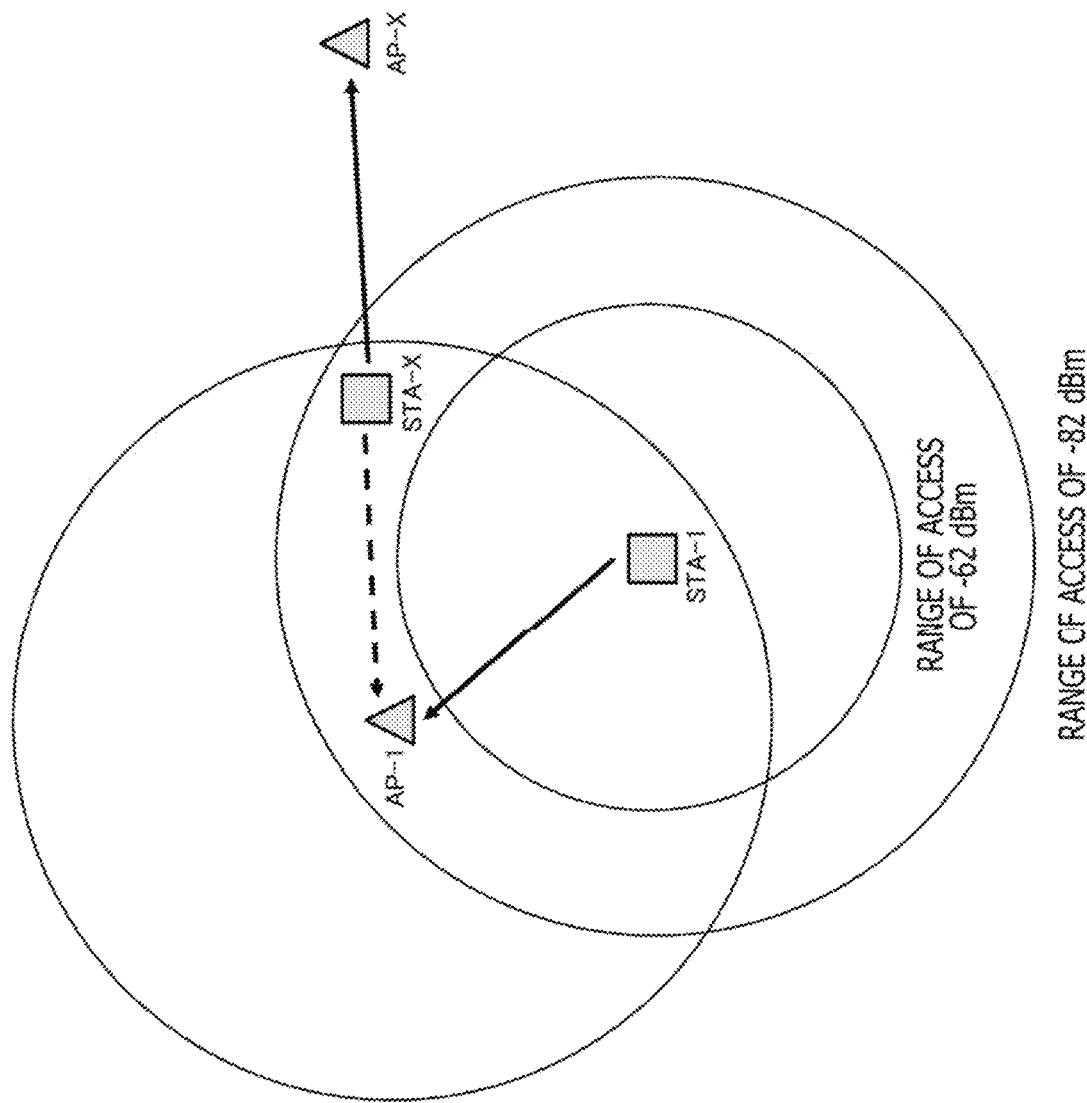
FIG. 6 is a diagram depicting an example of a configuration of a wireless network topology.

A case of applying the multichannel signal transmission procedure depicted in FIG. 5 in a wireless network topology depicted in FIG. 6 will be considered.

It is noted, however, that the network topology is supposed in FIG. 6 such that a base station AP-1 causes a wireless terminal STA-1, which is connected to the base station AP-1, to perform uplink signal transmission using either the primary channel or the secondary channel (non-primary channel), and that a STA-X belonging to the other BSS acts as an interference source for the AP-1 at a time of the uplink signal transmission.

Furthermore, it is supposed that the STA-X can receive a transmitted signal from the STA-1 at −72 dBm, that is, the STA-X is present in a range of access of signals at −82 dBm but out of a range of access of signals at −62 dBm.

When trying to transmit a signal at 40 MHz to a base station AP-X to which the STA-X is connected by channel bonding of combining the primary channel and the non-primary channel, the STA-X executes the signal transmission procedure depicted in FIG. 5.

In other words, the STA-X tries to detect a signal received at power equal to or higher than −82 dBm in the primary channel using the mechanism CCA-PD (or CCA-SD).

When the STA-X does not detect a signal in the primary channel for a certain time or longer, the STA-X determines that the primary channel is not used by the other terminal and is available to the STA-X. Subsequently, the STA-X tries to detect a signal received at power equal to or higher than −62 dBm in the non-primary channel before a certain time (PIFS) using the mechanism CCA-ED, and confirms a usage situation of the non-primary channel.

Figure 7:
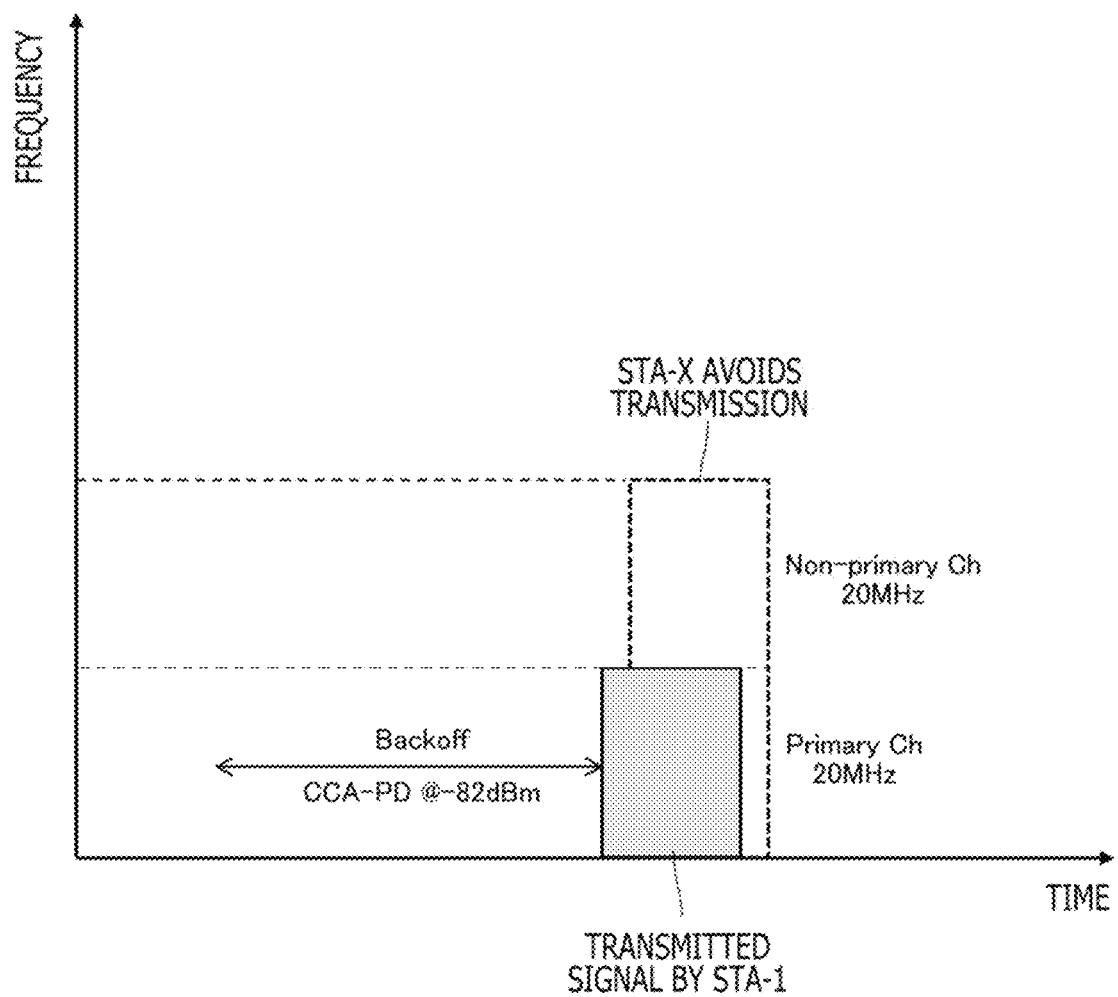
FIG. 7 is a diagram depicting a state in which a STA-X detects a transmitted signal by a STA-1 using a primary channel and refrains from signal transmission.

The AP-1 is causing the STA-1 to perform uplink signal transmission using either the primary channel or the non-primary channel. In a case in which the STA-1 is transmitting a signal using the primary channel, the STA-X can detect the signal at −72 dBm (as described above). Therefore, the STA-X detects that the primary channel is being used and refrains from signal transmission of the STA-X; thus, it is possible to avoid collision against the STA-1, that is, avoid interference with the AP-1 (refer to FIG. 7).

Figure 8:
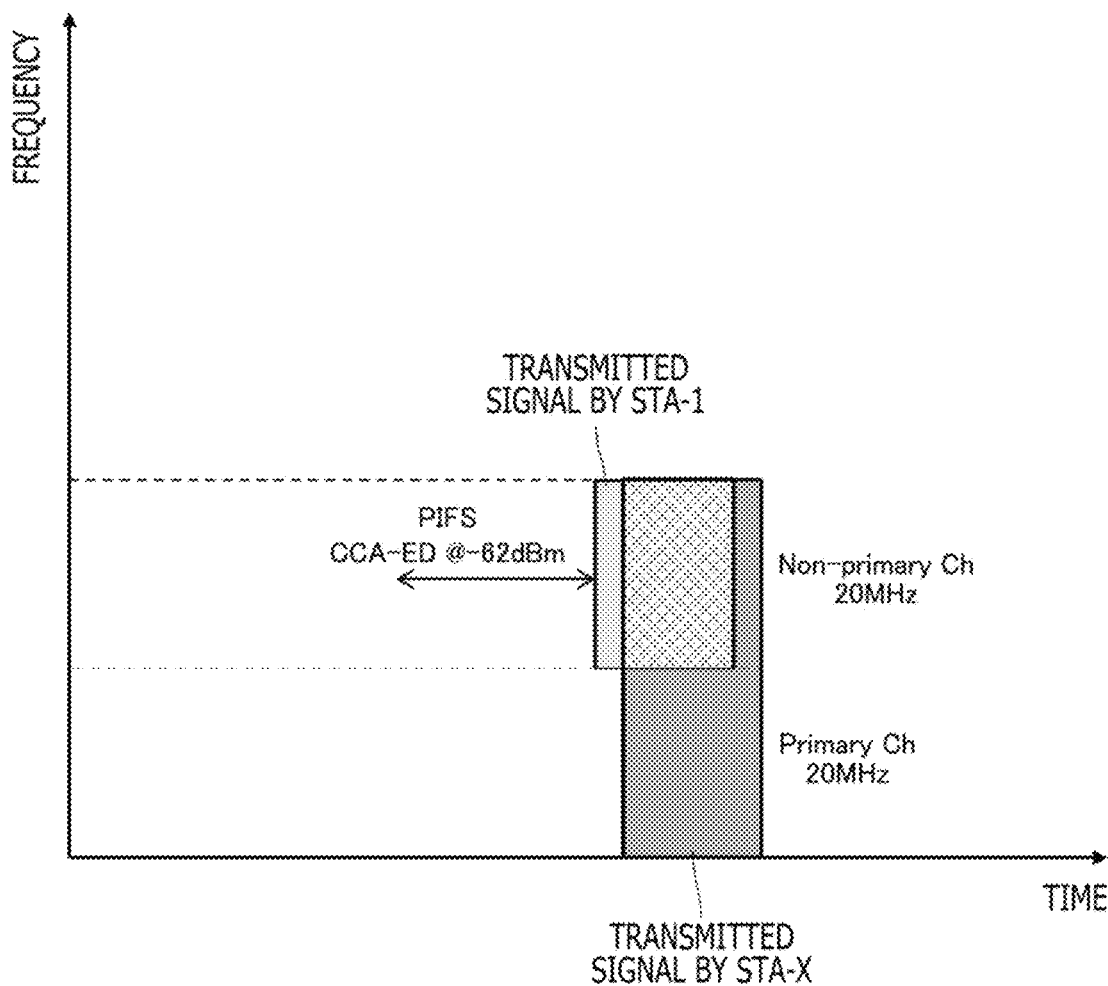
FIG. 8 is a diagram depicting a state in which a transmitted signal by the STA-X using channel bonding collides against a transmitted signal by the STA-1 using solely the non-primary channel.

On the other hand, in a case in which the STA-1 is transmitting a signal using solely the non-primary channel, the STA-X can detect only a signal at power equal to or higher than −62 dBm in the non-primary channel; thus, the STA-X is unable to detect the signal. Owing to this, the STA-X starts a signal at 40 MHz by combining the primary channel and the non-primary channel using the channel bonding. As a result, the asymmetry in interference results in occurrence of collision against the STA-1, that is, interference with the AP-1 (refer to the shaded portion in FIG. 8).

To address the problem, the base station AP-1 designates a transmission scheme of the wireless terminal STA-1 connected to the AP-1 to the wireless terminal STA-1 in the light of the asymmetry in interference amount with respect to the transmission using the primary channel and that using the non-primary channel at a time of permitting the wireless terminal STA-1 to transmit a signal using solely the non-primary channel. Specifically, the following two designation methods can be cited as an example.

(1) To increase transmission power in the non-primary channel.
(2) To reduce a data rate used in the non-primary channel.

The STA-1 increases the transmission power and transmits a signal in the non-primary channel, whereby the STA-X that is the interference source can detect the signal from the STA-1 in the non-primary channel before a certain time (PIFS) using the mechanism CCA-ED, refrain from signal transmission, and, therefore, avoid collision.

Furthermore, the STA-1 transmits a signal at a low data rate, thereby improving resistance against interference. As a result, even if suffering the interference from the STA-X, the AP-1 can receive the signal from the STA-1 and accurately demodulate and decode the signal.

It is noted that "to increase" the transmission power in the non-primary channel means to set the transmission power higher than that at a time of signal transmission using the specific primary channel (including using the channel bonding) (similarly hereinafter). Moreover, "to reduce" the data rate in the non-primary channel means to set the data rate lower than that at the time of signal transmission using (including using the channel bonding) (similarly hereinafter).

At the time of permitting the STA-1 to transmit a signal using solely the non-primary channel, the AP-1 may designate any one of the transmission schemes (1) and (2) or designate both the transmission schemes (1) and (2) simultaneously. Designating both of the transmission schemes (1) and (2) simultaneously makes it possible for the STA-X to avoid the interference and makes it easier for the AP-1 to accurately demodulate and decode the signal even if the STA-X transmits a signal by the channel bonding.

A case in which the STA-1 applies the transmission scheme (1) or (2) and transmits a signal using solely the non-primary channel in the wireless network topology as depicted in FIG. 6 will be considered. It is noted, however, that the STA-X is present in a location in which the STA-X can receive a transmitted signal by the STA-1 at −72 dBm and executes the signal transmission procedure depicted in FIG. 5 when trying to transmit a signal at 40 MH to the AP-X using the channel bonding.

First, the STA-X tries to detect a signal received at power equal to or higher than −82 dBm in the primary channel using the mechanism CCA-PD (or CCA-SD). When the STA-X does not detect a signal in the primary channel for certain time or longer, the STA-X then determines that the primary channel is not used by the other terminal and is available to the STA-X. Subsequently, the STA-X tries to detect a signal received at power equal to or higher than −62 dBm in the non-primary channel using the mechanism CCA-ED, and confirms the usage situation of the non-primary channel.

Figure 11:
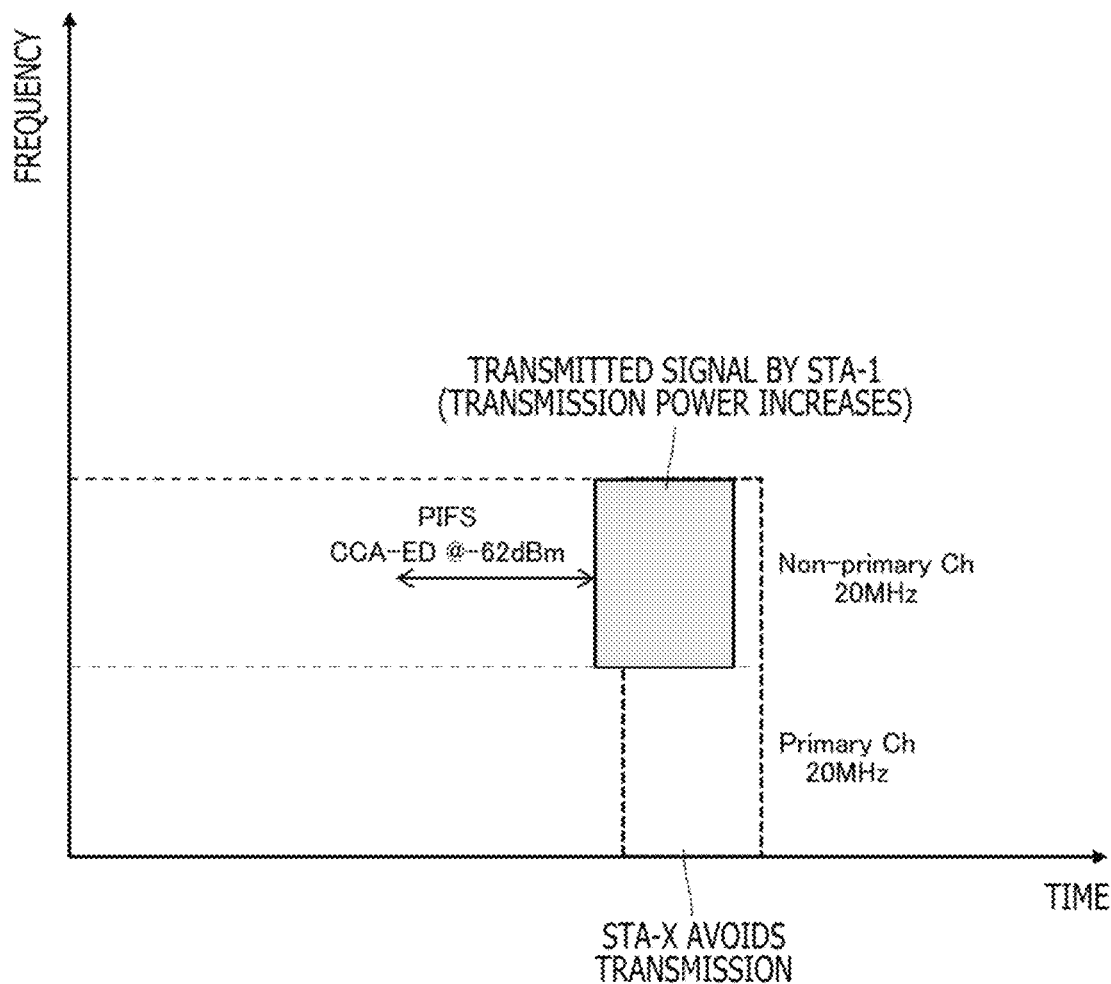
FIG. 11 is a diagram depicting a state in which the STA-X detects a transmitted signal at increased transmission power by the STA-1 using the non-primary channel and refrains from signal transmission.

The STA-1 increases the transmission power and executes the signal transmission using solely the non-primary channel. While the STA-X can detect only signals at power equal to or higher than −62 dBm in the non-primary channel, the STA-X can detect the transmitted signals by the STA-1 because of the increased transmission power. Therefore, the STA-X detects that the primary channel is being used and refrains from signal transmission of the STA-X; thus, the STA-X can avoid the collision against the STA-1, that is, the interference with the AP-1 (refer to FIG. 11.)

Figure 12:
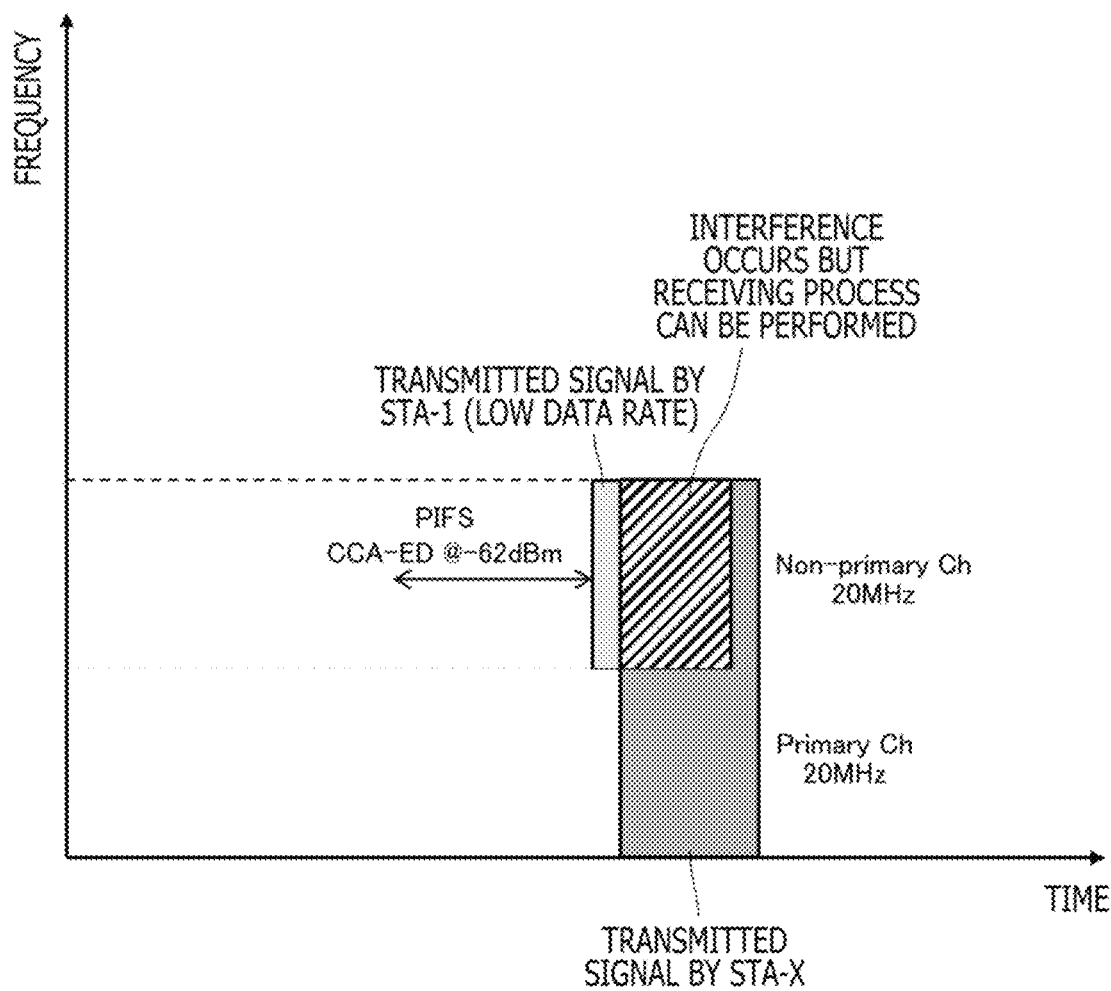
FIG. 12 is a diagram depicting a state in which a transmitted signal by the STA-X using channel bonding interferes with a transmitted signal by the STA-1 using solely the non-primary channel but an AP-1 correctly performs a receiving process.

Alternatively, the STA-1 does not increase the transmission power but executes the signal transmission using solely the non-primary channel at a low data rate. Since the STA-X can detect only the signals at power equal to or higher than −62 dBm in the non-primary channel, the STA-X is unable to detect the signal. Owing to this, the STA-X starts a signal at 40 MHz by combining the primary channel and the non-primary channel using the channel bonding. As a result, the signal from the STA-X interferes with the signal from the STA-1 received by the AP-1 (part painted out by oblique lines in FIG. 12); however, the AP-1 can accurately perform a receiving process (demodulation and decoding process) since the low data rate is applied and the resistance against the interference is improved.

Likewise, in a case in which the STA-X is unable to detect the signal from the STA-1 and starts the signal transmission using the channel bonding although the STA-1 increases the transmission power of the transmitted signal using solely the non-primary channel, the STA-1 transmits a signal at a low data rate and the AP-1 can thereby accurately perform the receiving process.

Therefore, the base station determines scheduling and signaling for the subordinate wireless terminal in the light of the asymmetry in interference amount among the channels, thereby improving the utilization efficiency of the non-primary channel and improving throughput.

For example, a scheme that the base station induces the subordinate wireless terminal to transmit a signal using a trigger frame is introduced in IEEE802.11ax (described above). The base station can use this trigger frame to designate a data length, a use transmission rate, and the like to the wireless terminal permitted to transmit an uplink signal. Therefore, the base station is only required to use the trigger frame at the time of permitting the subordinate wireless terminal to transmit a signal using solely the non-primary channel to designate the transmission power higher than that at the time of using the primary channel or to designate MCS (Modulation and Coding Scheme) information at a lower data rate and a higher interference resistance in the light of the asymmetry in interference.

Figure 9:
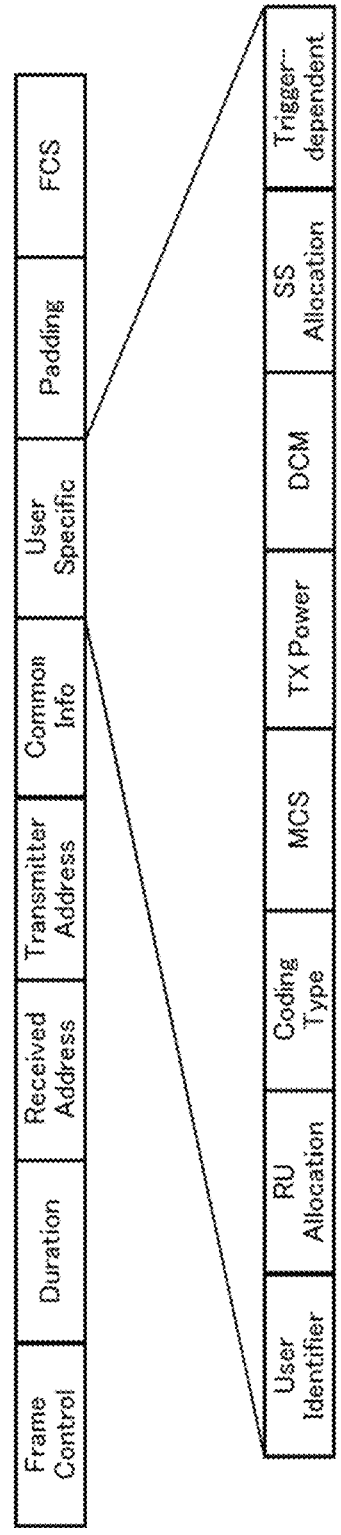
FIG. 9 is a diagram depicting an example of a configuration of a trigger frame.

FIG. 9 depicts an example of a configuration of the trigger frame used in the present embodiment.

A Frame Control field is a region where information associated with MAC (Media Access Control) frame control, and contains information associated with a type of this frame. A Duration field is a region where a planned period for using a wireless line by transmission of the frame is stored.

A Receiver Address field is a region where a destination address of this frame is stored. In the Receiver Address field of the trigger frame, a broadcast address is stored.

A Transmitter Address field is a region where a source of this frame is stored. In the Transmitter Address field of the trigger frame, an address of the base station that is the source is described in, for example, an MAC address format.

A Commom Info field is a region where information that can be referred to by all wireless terminals is stored, and contains, for example, a PPDU (PLCP (Physical Layer Convergence Protocol) Protocol Data Unit) length and frame/header information regarding a PHY layer.

A User Specific field is a region where information that can be referred to by the individual wireless terminal is stored. The User Specific fields are repeatedly provided by as many as the number of wireless terminals induced to transmit frames by the trigger frame (that is, permitted to make uplink user communication), and information regarding each wireless terminal permitted to transmit the frames is described in each User Specific field.

Furthermore, a frame length of the trigger frame is adjusted by a Padding field, and an FCS (frame check sequence) is added to a trail end of the trigger frame for error detection.

In one User Specific field, such fields as User Identifier, RU Allocation, Coding Type, MCS, DCM, SS Allocation, Trigger-dependent are provided.

The User Identifier field is a region that indicates an AID (Association Identifier) of the wireless terminal permitted to transmit frames by the trigger frame. It is noted that the AID is an identifier (well known) unique to each BSS, and has an information volume of 11 bits normally indicated by a number from 1 to 2007. In each of the subsequent fields RU Allocation, Coding Type, MCS, DCM, SS Allocation, and Trigger-dependent, information associated with the wireless terminal identified by the AID is stored.

The RU Allocation field is a region that indicates a resource unit (RU) used by the corresponding wireless terminal in the uplink user communication. The RU is determined on the basis of 26 sub-carriers in a frequency axis direction and an OFDM symbol length in a time axis direction. A channel used by the corresponding wireless terminal can be designated in the RU Allocation field. In the present embodiment, it is supposed that the specific primary channel, the channel obtained by combining the primary channel and the non-primary channel by the channel bonding, or the sole non-primary channel is designated in the RU Allocation field.

The Coding Type field is a region that indicates a coding scheme of a PPDU transmitted by the corresponding wireless terminal. The MCS field is a region that indicates MCS (information regarding an indexed combination of a modulation scheme, a coding rate, and the like) of the PPDU transmitted by the corresponding wireless terminal. The TX Power field is a region that indicates the transmission power of the corresponding wireless terminal. In the present embodiment, in a case of designating the sole use of the non-primary channel to the corresponding wireless terminal in the RU Allocation field, it is supposed that MCS information at a low data rate and high interference resistance is designated in the MCS field, and the transmission power higher than that at the time of using the primary channel is designated in the TX Power field.

The DCM field is a region that indicates whether to use Dual Carrier Modulation for the PPDU transmitted by the corresponding wireless terminal. An SS (Spatial Stream) Allocation field is a region that indicates information regarding a spatial stream of the PPDUs transmitted by the corresponding wireless terminal. The Trigger-dependent field is a region where information in response to the type of the trigger frame is stored.

In this way, the base station can designate, to each subordinate wireless terminal, the higher transmission power than that at the time of using the primary channel or the MCS information at a low data rate and the high interference resistance in the trigger frame used at the time of permitting the signal transmission using solely the non-primary channel in the light of the asymmetry in interference described above.

Furthermore, the base station may designate the channel and the transmission scheme used by each subordinate wireless terminal using not the trigger frame but a beacon frame or the other control frame, and may designate a transmission scheme for using the low data rate or the increased transmission power to the wireless terminal using solely the non-primary channel.

It is noted, however, that in a case of designating the sole use of the non-primary channel to the subordinate wireless terminal and designating the low MCS information or the high transmission power to the wireless terminal to which the sole use of the non-primary channel is designated, the base station may confirm capability information (whether the wireless terminal is compliant with a transmission process using solely the non-primary channel) about the wireless terminal in advance.

In a case of permitting transmission using solely the non-primary channel, arrangement may be made between the base station and the wireless terminal such that the base station does not necessarily designate the low MCS information or the high transmission power in the trigger frame and the wireless terminal automatically sets the low MCS or the high transmission power and performs signal transmission.

Moreover, each subordinate wireless terminal may notify a detected interference amount per channel of the base station so that the base station can appropriately determine scheduling and channel allocation for uplink communication in response to a wireless environment. The base station can allocate a less-interference channel (primary channel or non-primary channel) for the wireless terminal in accordance with notification from the wireless terminal.

For example, a dedicated frame for notifying the base station of the detected interference amount per channel may be newly defined and each wireless terminal may notify the base station of the detected interference amount using this dedicated frame. The wireless terminal may autonomously transmit the notification frame either at regular timing or at timing of sensing a change in the detected interference amount per channel, or may transmit the notification frame in response to reception of a request frame from the base station to which the wireless terminal is connected.

Alternatively, each wireless terminal may carry information associated with the detected interference amount per channel on a preamble or payload part of an uplink transmission frame induced to be transmitted by the trigger frame from the base station.

Furthermore, each wireless terminal may autonomously increase the transmission power or set the low data rate to transmit frames at a time of signal transmission using solely the non-primary channel without dependence on the trigger frame (or the other frame) received from the base station to which the wireless terminal is connected.

Moreover, in a case of the wireless terminal of a kind related to IoT or M2M and using only the non-primary channel, a transmission section may be provided in the wireless terminal right from the start to be configured to transmit a signal at transmission power equal to or higher than a predetermined value or at a low data rate.

Figure 10:
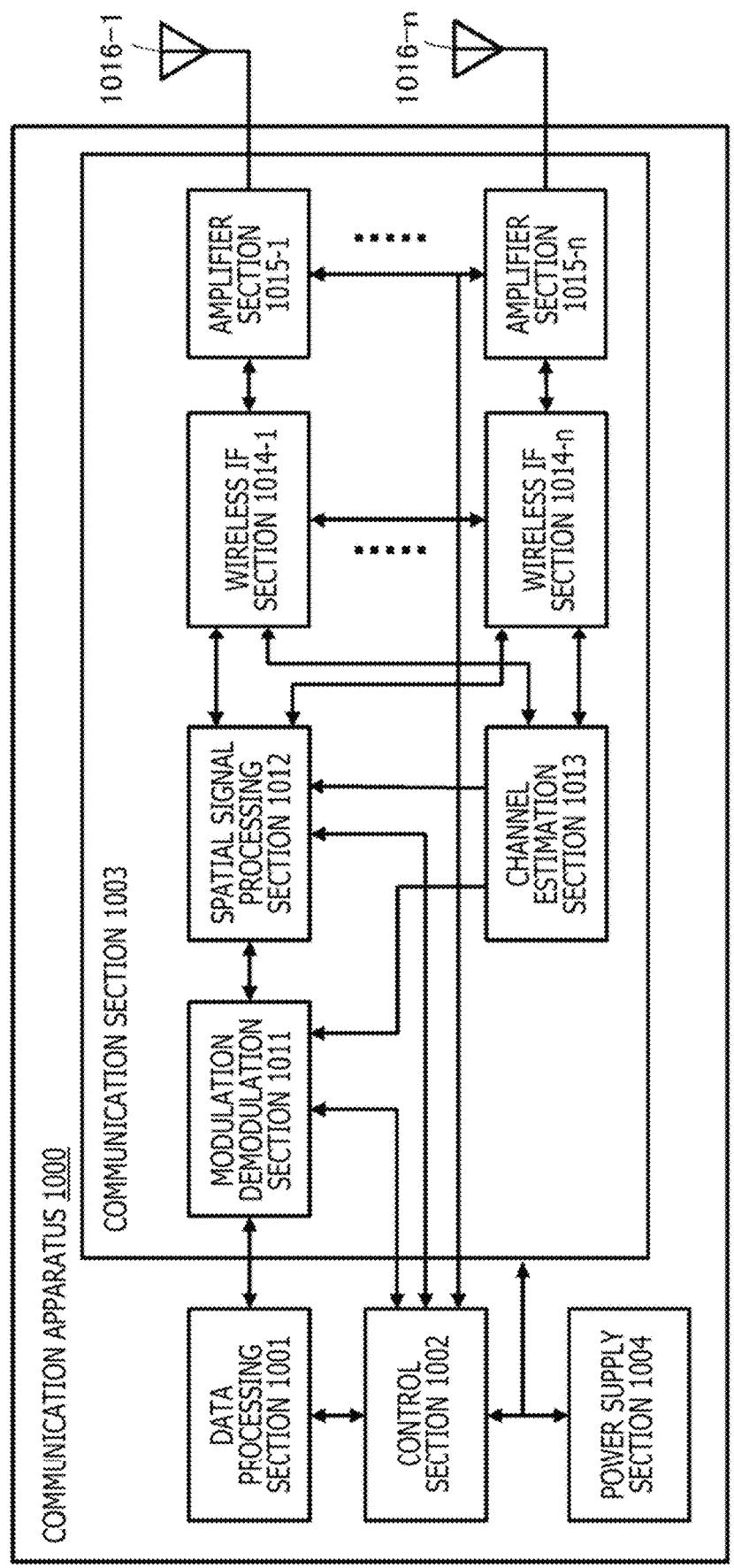
FIG. 10 is a diagram depicting an example of a functional configuration of a communication apparatus 1000.

FIG. 10 depicts an example of a functional configuration of a communication apparatus 1000 that performs a communication operation as the base station or the wireless terminal in the present embodiment. The communication apparatus 1000 depicted in FIG. 10 is supposed to operate as the AP-1 or the STA-1 in the wireless environment depicted, for example, in FIG. 6. It is to be understood that the base station and the wireless terminal are similar in basic configuration.

The communication apparatus 1000 is configured with a data processing section 1001, a control section 1002, a communication section 1003, and a power supply section 1004. The communication section 1003 further includes a modulation demodulation section 1011, a spatial signal processing section 1012, a channel estimation section 1013, a wireless interface (IF) section 1014, an amplifier section 1015, and an antenna 1016. It is noted, however, that one transmission and reception branch may be configured with a set of the wireless interface section 1014, the amplifier section 1015, and the antenna 1016, and that two or more transmission and reception branches may configure the communication section 1003. Moreover, a function of the amplifier section 1015 is often included in the wireless interface section 1014. It is noted, however, that the antenna 1016 may be attached into the communication section 1003 (or into the communication apparatus 1000), or attached to an exterior of the communication apparatus 1000.

At a time of transmission at which data is input from a protocol higher layer (not depicted), the data processing section 1001 generates packets for wireless transmission from the data, executes a process such as addition of headers for MAC control and addition of error detecting codes, and provides the processed data to the modulation demodulation section 1011. Furthermore, at a time of reception at which data is input from the modulation demodulation section 1011, the data processing section 1001 executes processes including analysis of the MAC headers, detection of a packet error, and a reordering process, and provides the processed data to the protocol higher layer.

The control section 1002 exercises control over the sections in the communication apparatus 1000 to transmit and receive information among the sections. In addition, the control section 1002 sets parameters in the modulation demodulation section 1011 and the spatial signal processing section 1012, and determines packet scheduling in the data processing section 1001. Furthermore, the control section 1002 sets parameters in the wireless interface section 1014 and the amplifier section 1015, and exercises control over the transmission power.

Moreover, in a case in which the communication apparatus 100 operates as the base station, the control section 1002 controls the sections in the communication apparatus 1000 in such a manner as to transmit the trigger frame for controlling an upper link user communication operation performed by each subordinate wireless terminal. For example, at a time of permitting the wireless terminal to transmit a signal using solely the non-primary channel, the control section 1002 designates the high transmission power or the MCS information in which the data rate is reduced in the trigger frame in the light of the asymmetry in interference amount with respect to the transmission by the primary channel and that by the non-primary channel.

On the other hand, in a case in which the communication apparatus 1000 operates as the wireless terminal, the control section 202 controls the sections in the communication apparatus 1000 in such a manner as to execute upper link user communication in accordance with information described in the received trigger frame. For example, in the case in which the wireless terminal is permitted to transmit a signal using solely the non-primary channel, the control section 1002 exercises control to transmit upper link frames using the modulation and coding scheme corresponding to the high transmission power or the MCS information in which the data rate is reduced in accordance with designation in the corresponding User Specific field in the trigger frame (or in the light of the asymmetry in interference amount with respect to the transmission by the primary channel and that by the non-primary channel). Moreover, the control section 1002 in this case controls the sections in the communication apparatus 1000 in such a manner as to transmit frames each carrying thereon information associated with the interference amount per channel detected by the communication section 1003 to the base station to which the wireless terminal is connected as needed.

Furthermore, in a case in which the communication apparatus 1000 operates as the wireless terminal in an autonomous distributed manner, the control section 1002 controls the sections in the communication apparatus 1000 in such a manner as to transmit frames while autonomously increasing the transmission power or setting the low data rate when the non-primary channel is used.

Moreover, in a case in which the communication apparatus 1000 operates as the wireless terminal of a kind related to IoT or M2M and uses solely the non-primary channel, the control section 1002 controls the sections in the communication apparatus 1000 in such a manner as to transmit frames at the increased transmission power or at a low data rate. Alternatively, in the case in which the communication apparatus 1000 operates as the wireless terminal of the kind related to IoT or M2M, the communication apparatus 1000 is often configured to transmit the frame at the high transmission power and at a low data rate right from the start without dependence on the control of the control section 1002.

At the time of transmission, the modulation demodulation section 1011 performs processes including encoding, interleaving, and modulation on input data from the data processing section 1001 on the basis of the coding and modulation scheme set by the control section 1002, generates a data symbol stream, and provides the data symbol stream to the spatial signal processing section 1012. In addition, at the time of reception, the modulation demodulation section 1011 performs opposite processes including demodulation, deinterleaving, and decoding to those at the time of transmission on the input data from the spatial signal processing section 1012 on the basis of the coding and modulation scheme set by the control section 1001, and provides the processed data to the data processing section 1001 or the control section 1002.

At the time of transmission, the spatial signal processing section 1012 performs a signal process for space separation on the input data from the modulation demodulation section 1011 as needed, and provides one or more obtained transmitted symbol streams to the wireless interface section 1014. On the other hand, at the time of reception, the spatial signal processing section 1012 performs a signal process on the received symbol stream input from the wireless interface section 1014, performs stream space resolving of the stream as needed, and provides the space resolved symbol stream to the modulation demodulation section 1011.

The channel estimation section 1013 calculates complex channel gain information regarding the channel from the preamble part and a training signal part out of the input signal from the wireless interface section 1014. The calculated complex channel gain information is used in a demodulation process performed by the modulation demodulation section 1011 and a spatial process performed by the spatial signal processing section 1012 via the control section 1002.

At the time of transmission, the wireless interface section 1014 converts input data from the spatial signal processing section 1012 into an analog signal, executes filtering and upconversion into a carrier frequency, and sends the data to the antenna 1016 or the amplifier section 1015. On the other hand, at the time of reception, the wireless interface section 1014 performs opposite processes to those at the time of transmission such as downconversion and conversion into a digital signal on the input data (received signal of the carrier frequency) from the antenna 1016 or the amplifier section 1015, and provides the data to the spatial signal processing section 1012 and the channel estimation section 1013.

At the time of transmission, the amplifier section 1015 amplifies the analog signal input from the wireless interface section 1014 up to predetermined power, and sends the amplified analog signal to the antenna 1016. In addition, at the time of reception, the amplifier section 1015 performs low-noise amplification on the input received signal from the antenna 1016, and outputs the resultant signal to the wireless interface section 1014. At least one of the function at the time of transmission or that at the time of reception of this amplifier section 1015 is often included in the wireless interface section 1014.

The power supply section 1004 is configured with a battery power supply or a fixed power supply such as a commercial power supply, and supplies power for driving to the sections in the communication apparatus 1000.

While the communication apparatus 1000 can be further configured with functional modules other than those depicted in FIG. 10, the functional modules are of no direct relevance to the technique disclosed in the present specification and are, therefore, not illustrated and described herein.

Figure 13:
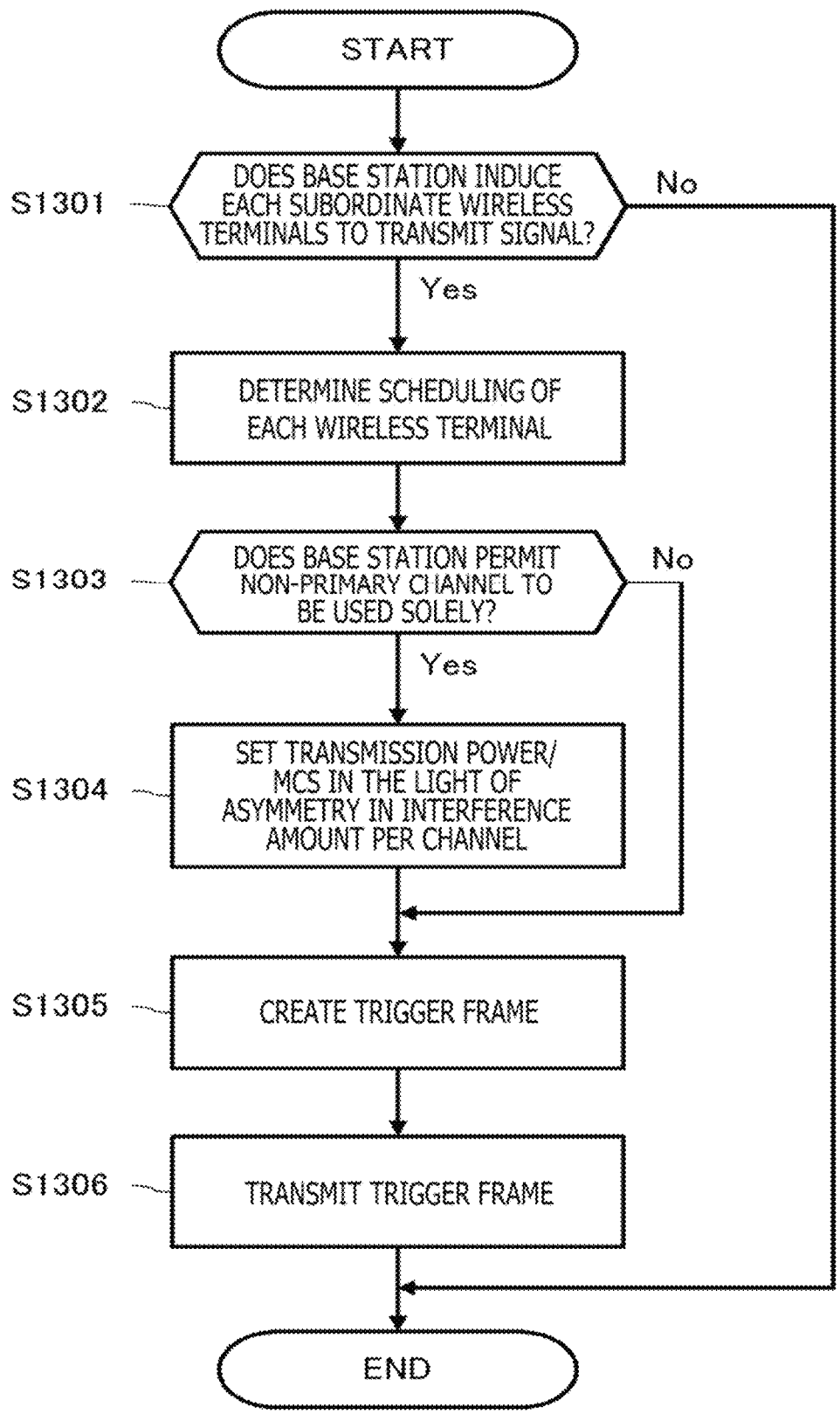
FIG. 13 is a flowchart depicting an example of a processing procedure executed when a base station induces a subordinate wireless terminal to transmit a signal.

FIG. 13 depicts an example of a processing procedure executed when the base station induces the subordinate wireless terminal to transmit a signal in a flowchart form. The processing procedure depicted in FIG. 13 is mainly executed by the control section 1002 in the communication apparatus 1000 operating as the base station.

It may be premised that before start of this processing procedure, the base station confirms the capability information (whether the wireless terminal is compliant with the transmission process using solely the non-primary channel) about the wireless terminal in advance.

When inducing each subordinate wireless terminal to transmit an uplink signal (Step S1301, Yes), the base station determines scheduling of the wireless terminal permitted to transmit a signal (Step S1302).

At this time, the base station checks whether to permit signal transmission using solely the non-primary channel (Step S1303). In a case of permitting signal transmission using solely the non-primary channel (S1303, Yes), the base station sets the transmission power and the MCS in the light of the asymmetry in interference amount per channel to the corresponding wireless terminal (Step S1304). In other words, the base station sets at least one of the increased transmission power or the low MCS to the wireless terminal permitted to transmit a signal using solely the non-primary channel.

Next, the base station determines contents to be described in the User Specific field per wireless terminal permitted to transmit a signal, and creates a trigger frame including a content set in Step S1304 (Step S1305). In a case of designating the sole non-primary channel in the RU Allocation field (or in a case of designating a channel that does not include the specific primary channel), the base station sets the MCS information at a low data rate in the MCS field or sets the increased transmission power in the TX Power field.

In addition, the base station sets the random latency (Backoff) by the collision avoidance mechanism and then transmits the trigger frame (Step S1306).

Figure 14:
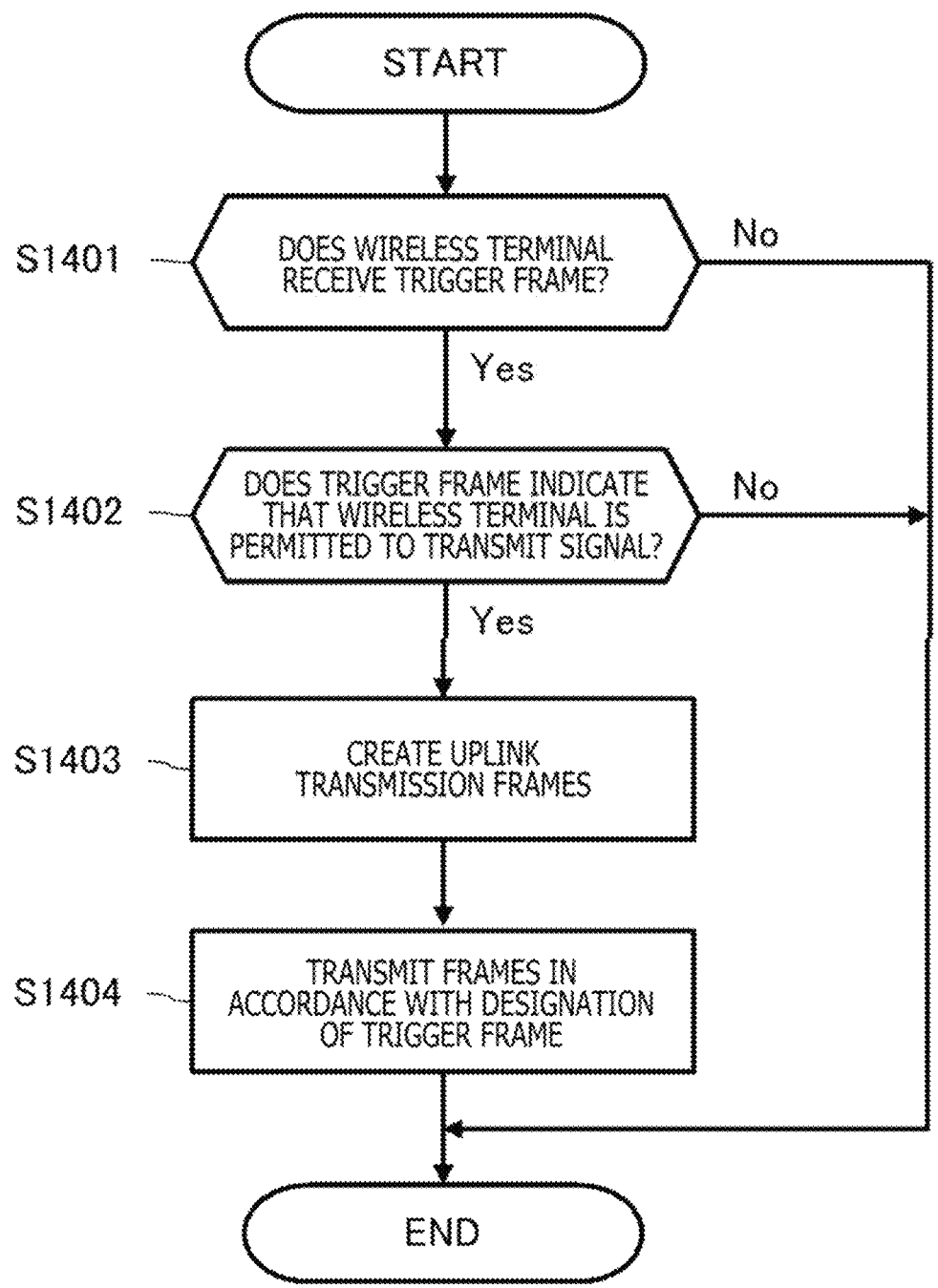
FIG. 14 is a flowchart depicting an example of a processing procedure executed when a wireless terminal is induced to transmit a signal by a base station to which the wireless terminal is connected.

Furthermore, FIG. 14 depicts an example of a processing procedure executed when the wireless terminal is inducted to transmit a signal by the base station to which the wireless terminal is connected in a flowchart form. The processing procedure depicted in FIG. 14 is mainly executed by the control section 1002 in the communication apparatus 1000 operating as the wireless terminal.

It may be premised that before start of this processing procedure, the base station to which the wireless terminal is connected confirms the capability information (whether the wireless terminal is compliant with the transmission process using solely the non-primary channel) about the wireless terminal in advance.

When receiving a trigger frame from the base station to which the wireless terminal is connected (Step S1401, Yes), the wireless terminal checks whether the wireless terminal is permitted to transmit a signal by the trigger frame (Step S1402).

The wireless terminal can check whether the wireless terminal is permitted to transmit a signal depending on whether the User Specific field indicating the AID of the wireless terminal in the User Identicication field is present in the received trigger frame. At this time, when the User Specific field corresponding to the wireless terminal is not present and the wireless terminal is not permitted to transmit a signal (Step S1402, No), the present process is ended.

Furthermore, in a case in which the User Specific field corresponding to the wireless terminal is present in the received trigger frame and the wireless terminal is permitted to transmit a signal (Step S1402, Yes), the wireless terminal creates frames to be transmitted to the base station by uplink communication (Step S1403), and executes frame transmission in accordance with the contents designated in the User Specific field (Step S1404).

In a case in which the sole non-primary channel is designated in the RU Allocation field (or in a case in which a channel that does not include the specific primary channel is designated), the MCS information at a low data rate is set in the MCS field or the increased transmission power is set in the TX Power field.

Therefore, the wireless terminal using solely the non-primary channel (or using the channel that does not include the specific primary channel) transmits uplink frames to the base station at a low data rate or the increased transmission power.

INDUSTRIAL APPLICABILITY

The technique disclosed in the present specification of the present disclosure has been described so far in detail while referring to the specific embodiment. Nevertheless, it is obvious that a person ordinary skill in the art could make revision of the embodiment or find replacements therefor within the scope of the technique disclosed in the present specification.

The technique disclosed in the present specification can be suitably applied to a wireless LAN system according to, for example, IEEE801.11ax standards. Moreover, the technique disclosed in the present specification can be suitably applied to a wireless communication system that uses the channel bonding for combining a plurality of channels including the specific primary channel and that permits the sole use of the channel other than the primary channel, or a wireless communication system in which a plurality of channels can be used and the interference amount per channel is asymmetry.

In summary, the technique disclosed in the present specification has been described in an illustrative form and should not be interpreted exclusively. Reference should be made to claims for the assessment of the scope of the technique disclosed in the present specification.

It is noted that the technique disclosed in the present specification can be configured as follows.

(1) A communication apparatus operating as a base station, including:
a communication section that transmits and receives a wireless signal; and
a control section that controls a channel used by a subordinate wireless terminal, in which
the control section designates a first transmission scheme to a first wireless terminal that uses a channel including a specific primary channel, and designates a second transmission scheme different from the first transmission scheme to a second wireless terminal that uses solely a non-primary channel.

(2) The communication apparatus according to (1), in which
the control section designates the second transmission scheme having a lower data rate or higher transmission power than a data rate or transmission power of the first transmission scheme to the second wireless terminal.

(3) The communication apparatus according to (1) or (2), in which
the control section designates the second transmission scheme different from the first transmission scheme to the second wireless terminal using a frame for inducing the subordinate wireless terminal to transmit a signal.

(4) The communication apparatus according to any one of (1) to (3), in which
the communication apparatus transmits a frame containing information regarding transmission power of the wireless terminal induced to transmit a signal.

(5) The communication apparatus according to any one of (1) to (4), in which
the control section controls the channel used by the wireless terminal on the basis of notification of a detected interference amount per channel received from the wireless terminal.

(6) A communication method by a communication apparatus operating as a base station, including steps of:
designating a first transmission scheme to a first wireless terminal that uses a channel including a specific primary channel; and
designating a second transmission scheme different from the first transmission scheme to a second wireless terminal that uses solely a non-primary channel.

(7) A communication apparatus operating to be subordinate to a base station, including:
a communication section that transmits and receives a wireless signal; and
a control section that controls a communication operation performed by the communication section, in which
the control section exercises control in such a manner as to execute signal transmission by a first transmission scheme when a channel including a specific primary channel is used or to execute signal transmission by a second transmission scheme different from the first transmission scheme when a non-primary channel is solely used.

(8) The communication apparatus according to (7), in which
the control section exercises control in such a manner as to execute signal transmission by the second transmission scheme having a lower data rate or higher transmission power than a data rate or transmission power of the first transmission scheme when the non-primary channel is solely used.

(9) The communication apparatus according to (7) or (8), in which
the communication apparatus receives a frame inducing the communication apparatus to transmit a signal from the base station, and
the control section exercises control over a channel and a transmission scheme used in signal transmission on the basis of the received frame.

(10) The communication apparatus according to any one of (7) to (9), in which
the communication apparatus receives a frame inducing the communication apparatus to transmit a signal and containing information regarding transmission power from the base station, and
the control section exercises control over the transmission power of a transmitted signal on the basis of the received frame.

(11) The communication apparatus according to any one of (7) to (10), further including:
a detection section that detects an interference amount of each available channel, in which the control section exercises control to transmit notification of the detected interference amount per channel to the base station.

(12) A communication method by a communication apparatus operating to be subordinate to a base station, including steps of:
executing signal transmission by a first transmission scheme using a channel including a specific primary channel; and
executing signal transmission by a second transmission scheme different from the first transmission scheme using solely a non-primary channel.

REFERENCE SIGNS LIST

1000 . . . Communication apparatus, 1001 . . . Data processing section, 1002 . . . Control section, 1003 . . .

Communication section, 1004 . . . Power supply section, 1011 . . . Modulation demodulation section, 1012 . . . Spatial signal processing section, 1013 . . . Channel estimation section, 1014 . . . Wireless interface section, 1015 . . . Amplifier section, 1016 . . . Antenna

The invention claimed is:

1. A communication apparatus operating as a base station, comprising:
   circuitry configured to:
   receive, from each of a first wireless terminal and a second wireless terminal, a first frame, wherein
      the first frame includes information associated with an interference amount of each of a primary channel and a non-primary channel;
   control, based on the received first frame, transmission of a second frame to each of the first wireless terminal and the second wireless terminal;
   designate, using the transmitted second frame, a first transmission power and a channel including a specific primary channel to the first wireless terminal;
   designate, using the transmitted second frame, solely the non-primary channel to the second wireless terminal; and
   designate, using the transmitted second frame, a second transmission power to the second wireless terminal based on the designation of solely the non-primary channel to the second wireless terminal, wherein
      the first wireless terminal is different from the second wireless terminal,
      and
      the second transmission power is higher than the first transmission power.

2. The communication apparatus according to claim 1, wherein the circuitry is further configured to
   induce, based on the designation of the second transmission power to the second wireless terminal, the second wireless terminal to transmit a signal.

3. The communication apparatus according to claim 1, wherein
   the circuitry is further configured to induce at least one of the first wireless terminal or the second wireless terminal to transmit a signal.

4. A communication method, comprising:
   in a communication apparatus operating as a base station:
   receiving, from each of a first wireless terminal and a second wireless terminal, a first frame, wherein
      the first frame includes information associated with an interference amount of each of a primary channel and a non-primary channel;
   controlling, based on the received first frame, transmission of a second frame to each of the first wireless terminal and the second wireless terminal;
   designating, using the transmitted second frame, a first transmission power and a channel including a specific primary channel to the first wireless terminal;
   designating, using the transmitted second frame, solely the non-primary channel to the second wireless terminal; and
   designating, using the transmitted second frame, a second transmission power to the second wireless terminal based on the designation of solely the non-primary channel to the second wireless terminal, wherein
      the first wireless terminal is different from the second wireless terminal,
      and
      the second transmission power is higher than the first transmission power.

5. A communication apparatus, comprising:
   circuitry configured to:
   detect an interference amount of each of a primary channel and a non-primary channel;
   control, based on the detected interference amount of each of the primary channel and the non-primary channel, transmission of a first frame to a base station, wherein
      the transmitted first frame includes information associated with the detected interference amount;
   receive, based on the transmitted first frame, a second frame that induces the communication apparatus to transmit a wireless signal to the base station, wherein the communication apparatus is operating to be subordinate to the base station;
   determine, based on a specific field in the received second frame, that the communication apparatus is designated to transmit the wireless signal using solely the frame non-primary channel;
   autonomously increase a transmission power of the wireless signal based on the determination that the communication apparatus is designated to transmit the wireless signal using solely the non-primary channel; and
   control, using the increased transmission power, transmission of the wireless signal to the base station.

6. The communication apparatus according to claim 5, wherein the circuitry is further configured to control, based on the received second frame, the transmission of the wireless signal using solely the non-primary channel.

7. The communication apparatus according to claim 5, wherein the circuitry is further configured to:
   sense a change in the detected interference amount; and
   control transmission of the first frame autonomously based on the sensed change in the detected interference amount.

8. A communication method, comprising:
   in a communication apparatus operating to be subordinate to a base station:
   detecting an interference amount of each of a primary channel and a non-primary channel;
   controlling, based on the detected interference amount of each of the primary channel and the non-primary channel, transmission of a first frame to the base station, wherein
      the transmitted first frame includes information associated with the detected interference amount;
   receiving, based on the transmitted first frame, a second frame that induces the communication apparatus to transmit a wireless signal to the base station;
   determining, based on a specific field in the received second frame, that the communication apparatus is designated to transmit the wireless signal using solely the non-primary channel;
   autonomously increasing a transmission power of the wireless signal based on the determination that the communication apparatus is designated to transmit the wireless signal using solely the non-primary channel; and
   controlling, using the increased transmission power, transmission of the wireless signal to the base station.

* * * * *